United States Patent
Conover et al.

[11] Patent Number: 6,089,751
[45] Date of Patent: Jul. 18, 2000

[54] TRANSPARENT TEMPERATURE SENSOR FOR AN ACTIVE MATRIX LIQUID CRYSTAL DISPLAY

[75] Inventors: Kurt Conover; Marlin S. Hurt; Robert D. Habing; Gregory F. Weiner, all of Albuquerque; Vittorio T. Sandoval, Rio Rancho; Randall K. Cordova, Cedar Crest; E. A. Jaramillo; Michael R. Praiswater, both of Albuquerque; Teddy J. Wood, Corrales, all of N. Mex.

[73] Assignee: Honeywell Inc., Morristown, N.J.

[21] Appl. No.: 08/774,340

[22] Filed: Dec. 30, 1996

[51] Int. Cl.⁷ .............. G01K 7/00; G02F 1/13; G02F 1/15; G02F 1/133; H05B 1/00
[52] U.S. Cl. .......... 374/183; 374/170; 350/331; 219/209
[58] Field of Search .............. 374/170, 183; 349/21; 219/209, 210; 350/331

[56] References Cited

U.S. PATENT DOCUMENTS

| | | |
|---|---|---|
| 4,621,261 | 11/1986 | Hehlen et al. ............ 340/825.52 |
| 4,987,289 | 1/1991 | Bishop et al. ............ 219/209 |
| 5,247,374 | 9/1993 | Terada ............ 359/44 |
| 5,317,919 | 6/1994 | Awtrey ............ 73/718 |
| 5,523,873 | 6/1996 | Bradford, III et al. ............ 359/88 |
| 5,655,305 | 8/1997 | Fletcher ............ 374/170 |
| 5,813,982 | 9/1998 | Baratta ............ 600/398 |
| 5,818,010 | 10/1998 | McCann ............ 349/21 |

FOREIGN PATENT DOCUMENTS

| | | |
|---|---|---|
| 2538138-A1 | 12/1982 | France . |
| 4140415A1 | 9/1993 | Germany . |
| 54-064998 | 5/1979 | Japan . |
| 54-103366 | 8/1979 | Japan . |
| 59-197020 | 8/1984 | Japan . |

OTHER PUBLICATIONS

"Combination of heating and temperature measurement in a compact liquid–crystal cell"; Authored by W. Balzer and T. Tschudi, Journal of Physics E. Scientific Instruments, vol. 20, No. 5, pp. 568–571; 1987 IOP Publishing Ltd, Primary Examiner—G. Bradley Bennett
Assistant Examiner—Gail Verbitsky
Attorney, Agent, or Firm—Loria B. Yeadon; Andrew A. Abeyta

[57] ABSTRACT

A temperature sensor for the liquid crystal portion of a liquid crystal display assembly which includes a thin layer of transparent conductive material which is spread across the viewing area of the display. This layer of transparent conductive material can provide heat to warm up the display when a large voltage is put across it, and can also be used to measure liquid crystal temperature. It is known that the resistance of materials such as indium tin oxide (ITO) changes at a known rate with respect to temperature. By using this transparent layer of material in the stacked elements of a liquid crystal display assembly, an accurate reading of the liquid crystal temperature can be made.

14 Claims, 5 Drawing Sheets

6,089,751

TRANSPARENT TEMPERATURE SENSOR FOR AN ACTIVE MATRIX LIQUID CRYSTAL DISPLAY

UNITED STATES GOVERNMENT RIGHTS

The United States Government has acquired certain rights in this invention through Government Contract No. F33657-90-C-2233 awarded by the Department of the Air Force.

FIELD OF THE INVENTION

This invention relates to a temperature sensor for a liquid crystal display (LCD), and more particularly to a transparent temperature sensor which extends across the viewing area of the display.

BACKGROUND OF THE INVENTION

Liquid Crystal Displays (LCD's) have become very common in aircraft cockpits. The LCD's have taken the place of CRTs and other analog instruments which provide the pilot with the information necessary to operate the aircraft. One problem with installing LCD's in a cockpit is the harsh environment in which aircraft operate. In the case of military aircraft, temperatures in which the display must operate can vary from −40° C. to 100° C.

Twisted nematic liquid crystal displays used in the cockpits of aircraft typically include a matrix array of liquid crystal picture elements and a corresponding backlight for illuminating these elements. These pixels are often temperature dependent with respect to their normal operating characteristics in that an LCD relies on the behavioral characteristics of the twisted nematic crystalline layer as it is exposed to driving voltages. When such driving voltages are applied across the liquid crystal material, the nematic liquid crystals tend to align themselves so as to provide a desired image to the viewer. Because such voltage-related behavior of the twisted nematic material is a function of temperature, the overall performance of the corresponding display is temperature dependent. When below a particular temperature, twisted nematic liquid crystal material does not behave in a consistent manner. Accordingly, the LC material in such situations must be heated to a desired temperature in order to achieve satisfactory functionality. The amount of time it takes the LC material to be heated to this level is known as the display's "warm up" period of time.

In order to bring the liquid crystal material up to a desired operating temperature, a cockpit display must include some type of heating element. An integral heater element for an LCD generally comprises a thin film of transparent indium tin oxide (ITO) deposited proximate to the liquid crystal layer of the display. By maintaining an electrical potential connected to one edge of the ITO heater and switchably connecting the opposite side of the heater to ground, the LCD can be selectively heated during cold temperature operation.

When liquid crystal displays operate at a temperature which is too high, they have a tendency to crack. For this reason, it is desirable to mount on the liquid crystal display assembly a temperature sensor which closely monitors the temperature of the liquid crystal material. Because most temperature sensors are opaque, they have always been mounted somewhere on the LCD chassis and not in the viewing area. The sensors are usually mounted on the edges of the liquid crystal display on some kind of support structure. The disadvantage of this placement of the temperature sensor is that the sensors tend to average the LCD temperature with that of the chassis. This results in a thermal gradient greater than 120° C. under extreme temperature conditions.

Therefore, to avoid this type of cracking, a temperature sensor is needed which accurately measures the temperature of the LC material and not that of the display chassis.

SUMMARY OF THE INVENTION

The present invention described herein discloses a temperature sensor for a liquid crystal display. In typical LCD construction, a layer of liquid crystal is positioned between two transparent substrates. Electrodes which create a voltage are in electrical contact with the liquid crystal material. On the opposite side of the transparent substrate from the liquid crystal are polarizers. In direct contact with one of these polarizers is a transparent conductive layer. A precision current is transmitted through the transparent conductive layer. The voltage is then measured across the transparent conductive layer and from that, the total resistance is calculated. Changes in resistance of the transparent conductive layer are a function of the temperature of the metal. Based on this, the temperature of the liquids crystal display assembly in contact with the transparent conductive layer can be measured.

In one embodiment of the invention, the conductive layer also performs the heating function for the liquid crystal display. A switchable voltage source is connected to the transparent conductive layer which provides heating for the liquid crystal material.

In another embodiment of the invention, numerous precision temperature sensors are mounted in various places on a LCD assembly. At power up, readings are taken from these temperature sensors and if these readings all agree, they are then compared to the reading from the liquid crystal temperature sensor. If the readings of the precision temperature sensors do not agree with the liquid crystal temperature sensor, a correction is introduced into the liquid crystal temperature sensor measuring system to provide a more accurate output. A final embodiment is also included in which the temperature of the liquid crystal material is measured while the heating voltage is put across the transparent conductive layer.

BRIEF DESCRIPTION OF THE DRAWINGS

FIG. 5 shows a system diagram of the embodiment of the invention in which the temperature of the liquid crystal is measured while the heater element is on.

DESCRIPTION OF THE PREFERRED EMBODIMENT

Figure 1:
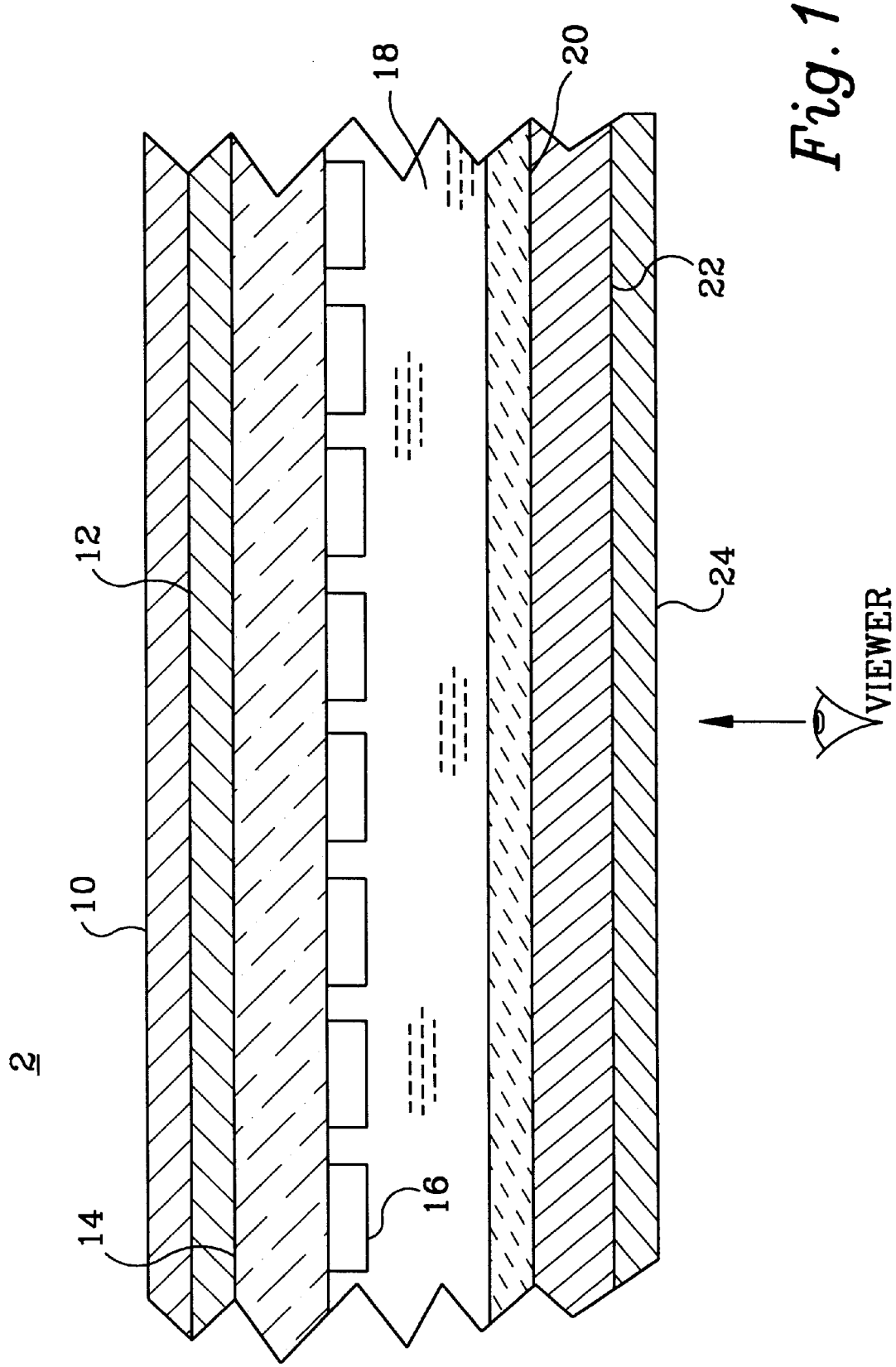
FIG. 1 shows a cross-section for the liquid crystal display used in the present embodiments.

Disclosed in FIG. 1 is a cross-section of a liquid crystal display (LCD) of the type used in the present invention. In this configuration, a layer of liquid crystal 18 is sandwiched between two transparent glass substrates 22 and 14. Also between the substrates are common electrode 20 and pixel electrodes 16. As is typical in display operation, a charge is generated across the electrodes and this charge affects the direction in which the liquid crystal is aligned. Also included in the LCD assembly are polarizing layers 12 and 24 as well as transparent conductive layer 10 which in the preferred embodiment is made of substantially transparent indium tin oxide (ITO).

When an LCD is used in a military aircraft cockpit, the display must be able to operate in a temperature range which can vary from −40° C. to in excess of 80° C. Because liquid crystal does not operate normally at temperatures below 0° C., a heating element is necessary in order to bring the temperature of the liquid crystal to a desirable level. In the configuration shown in FIG. 1, the typical means of providing this heat to the liquid crystal is to run a voltage across the ITO layer 10. Once sufficient heat is provided to the liquid crystal material to bring it up to a desirable operating temperature, the voltage across the ITO layer can then be shut off.

Figure 2:
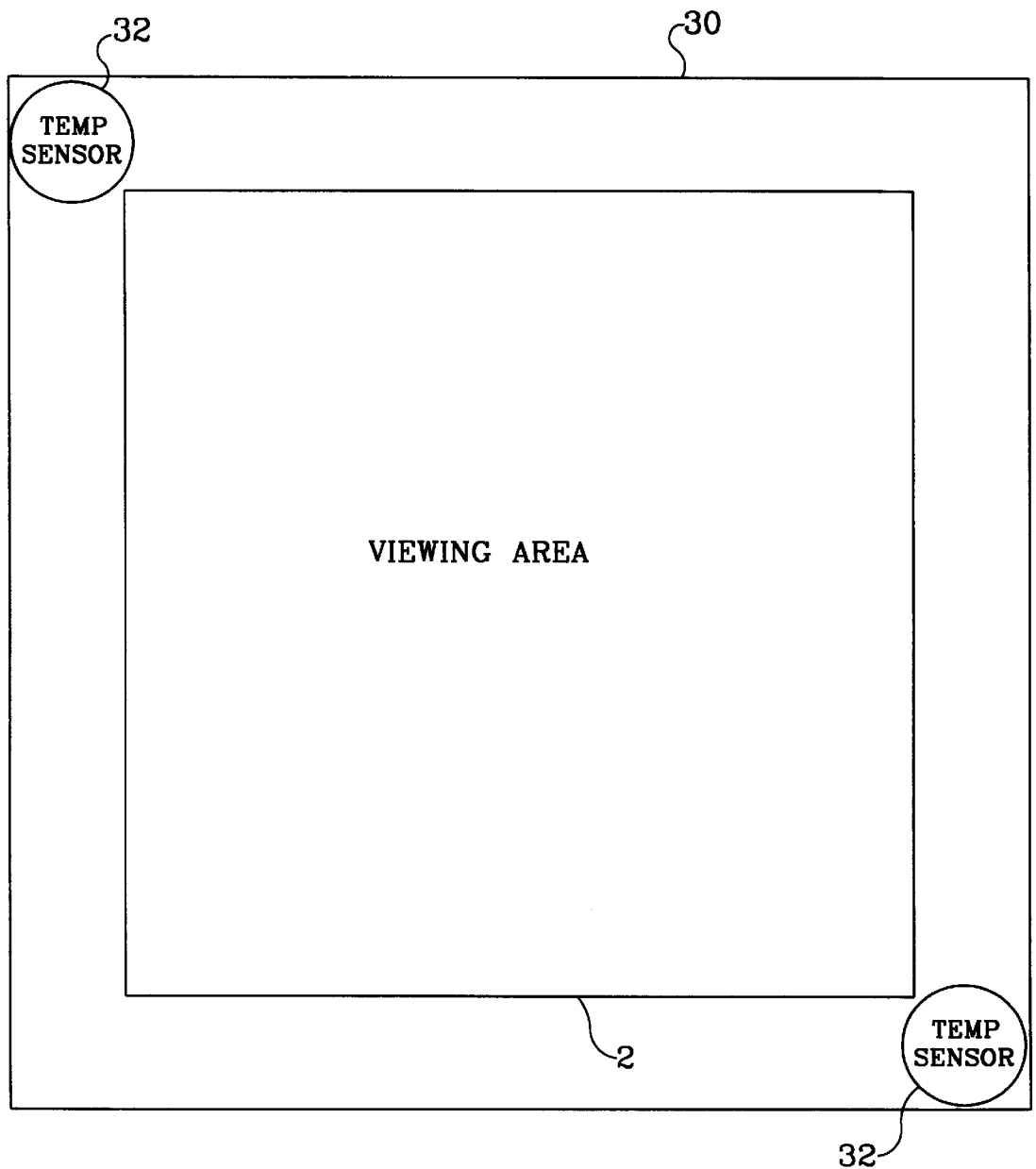
FIG. 2 shows the position of the temperature sensors in the prior art liquid crystal displays.

A drawback of using the heating element for the liquid crystal display is that if the temperature is not closely monitored and too much heat is added, the display will crack. In the prior art displays, temperature sensors are mounted on the display assembly to monitor the liquid crystal temperature. FIG. 2 discloses a typical prior art arrangement. In this assembly, temperature sensors 32 are mounted on the chassis 30 which provides support for the liquid crystal assembly 2. The drawback of this set up is that the temperature of the chassis is averaged in with the temperature of the liquid crystal material such that the actual temperature of the liquid crystal may indeed be hotter than what is registering on the temperature sensor. A temperature sensor is needed which does not interfere with the viewing of the display, but also provides an accurate measurement of the liquid crystal temperature.

Figure 3:
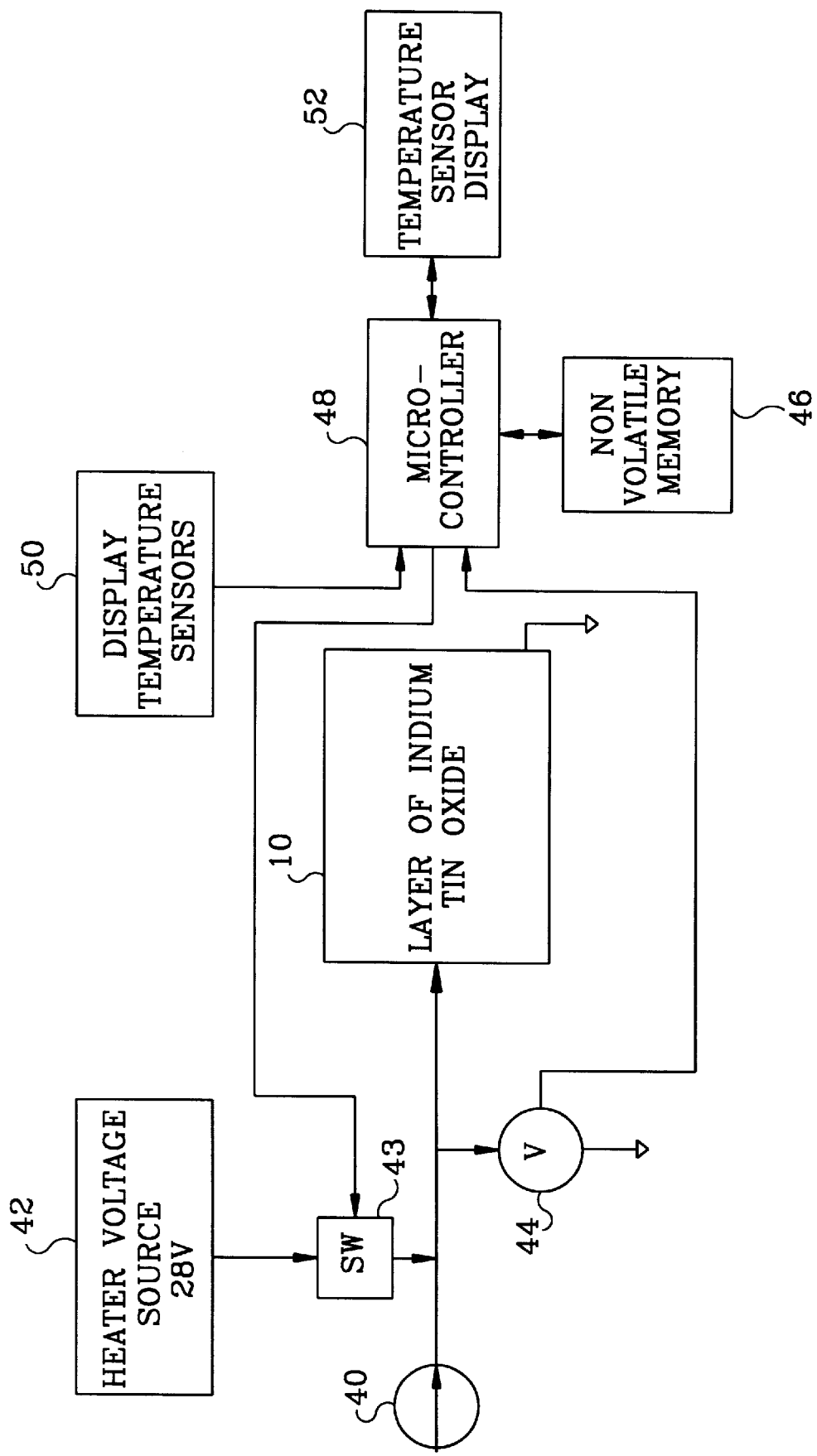
FIG. 3 shows a system diagram for the preferred embodiment of the invention.

Disclosed in FIG. 3 is a system diagram for the preferred embodiment of the invention. Included in this system is the heater voltage source 42 which is the source of energy used when the layer of ITO is heating the liquid crystal. Switch 43 is used to turn voltage source 42 on and off. Precision current source 40 provides a current of known magnitude which runs through the layer of ITO for measuring the liquid crystal temperature. Voltmeter 44 measures the voltage across the layer of ITO, and has an output which runs into microcontroller 48. The microcontroller 48, which is connected to switch 43, provides the commands to turn the heating element on and off. The microcontroller 48 also receives inputs from the display temperature sensors. These inputs are from precision temperature sensors which are mounted on most LCD assemblies. Also in connection with the microcontroller 48 is non-volatile memory 46. Finally, the microcontroller 48 outputs its temperature readings to a temperature sensor display control 52 which is viewed by the pilot. Commands are also transmitted from the temperature sensor display control 52 to the microcontroller to turn on and off the liquid crystal heating element.

In operation, the precision current source 40 is always activated and the current is run through the layer of ITO. Using voltmeter 44, the voltage across the ITO layer is measured. With the combination of a known voltage and current through the layer of ITO, the resistance is then calculated. This is done in microcontroller 48 which is in direct contact with voltmeter 44. Stored in non-volatile memory 46 is a transfer function which allows the microcontroller 48 to calculate a temperature value which is proportional to the resistance across the ITO layer.

The transfer function for the ITO layer is based on the calculated resistance of the ITO with respect to temperature. The rate of change of the resistance of the ITO with respect to temperature is a constant. The total resistance of the ITO may vary due to manufacturing tolerances which make the ITO either thicker or thinner; however, because the rate of change is constant, the use of this material makes a good temperature sensor.

If after taking a temperature measurement it is necessary to heat the display, switch 43 is closed and the heating voltage is run through the ITO layer. In the embodiment of FIG. 3, the heating process and the temperature measurement cannot be done at the same time. In order to take further temperature measurements, switch 43 must again be opened so that current from current source 40 is all that is running through the ITO layer.

In order to be sure that the liquid crystal temperature sensor remains accurate, its performance can be compared to other temperature sensors. It is common in a display which is incorporated into an aircraft, that various precision temperature sensors be mounted throughout the assembly, especially in the backlight area. These sensors monitor the temperature of components throughout the display assembly. The output of these temperature sensors are also connected to microcontroller 48 and are displayed in the cockpit. In order to properly calibrate the liquid crystal temperature sensor upon power up or after any power interruption, the microcontroller 48 will perform a comparison between the output of the liquid crystal temperature sensor and the other precision temperature sensors in the display. This process for calibrating the liquid crystal temperature sensor is disclosed in detail in FIG. 4.

First, in step 60, the microcontroller reads all the temperature sensor outputs except for that of the liquid crystal temperature sensor. At step 62 a determination is made as to whether all the sensors are giving the same readings within a particular range. If the sensors are close enough, a reading is then made from the liquid crystal sensor at step 64. At step 66, the difference is calculated between the liquid crystal temperature sensor and all the other display temperature sensors. The difference between the liquid crystal temperature sensor and all the other sensors is then stored in the non-volatile memory 46 and used as an offset for the liquid crystal temperatures whenever readings in the future are made. It is a simple process to add or subtract this value from the value already stored in microcontroller 48.

Figure 4:
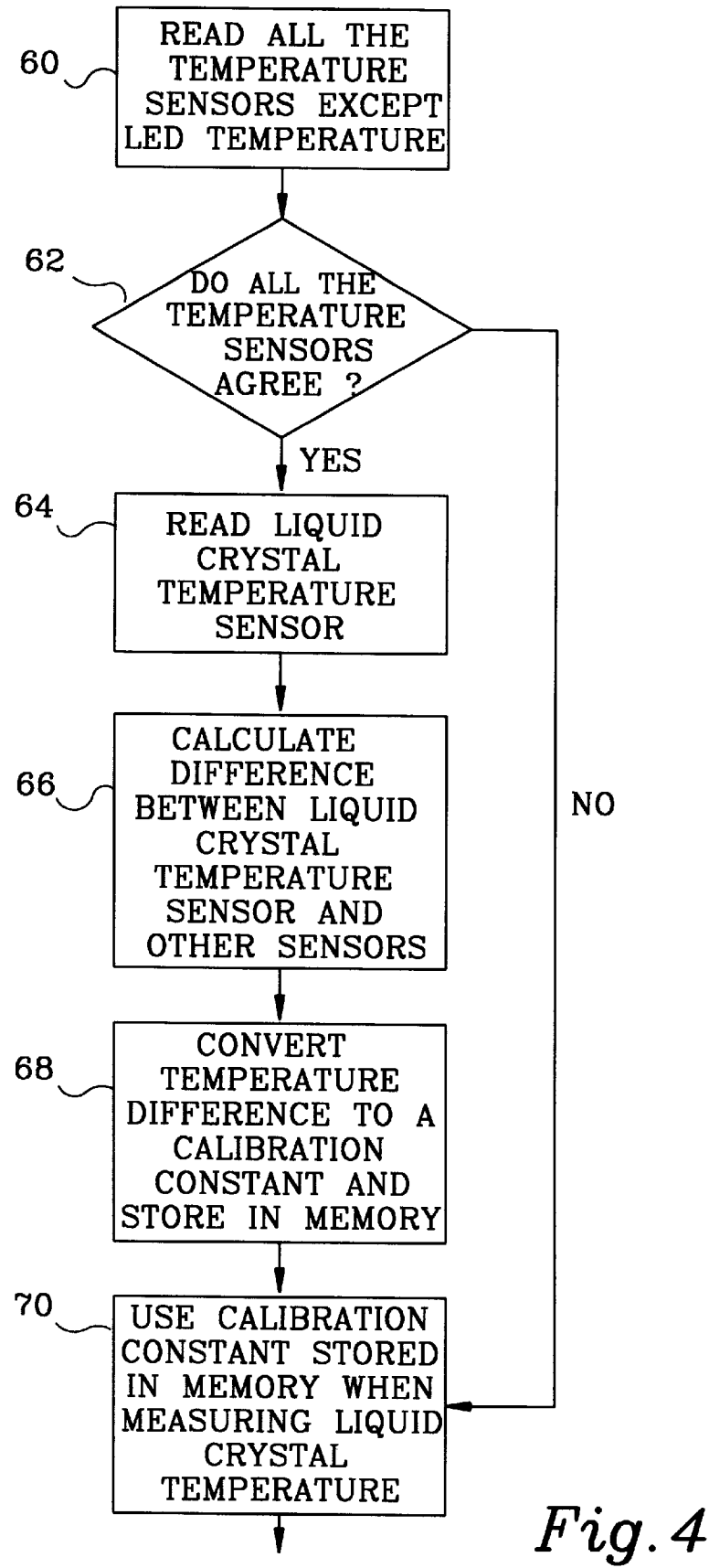
FIG. 4 shows a flow chart which describes the operation of the temperature correction for the liquid crystal temperature sensor.

In FIG. 4 at step 62, if all the sensors do not agree, then the value which was previously stored in non-volatile memory 46 is used as the offset for the temperature reading. This system works well, because when the LCD is powering up from a cold start, all components of the system should be the same and the sensor readings from the precision temperature sensor should agree on temperature. If, however, there was merely a power interruption and the display is still warm, the different parts of the assembly will have different temperatures and the precision temperature sensors will not agree. If this occurs the offset currently stored in the non-volatile memory is used.

Figure 5:
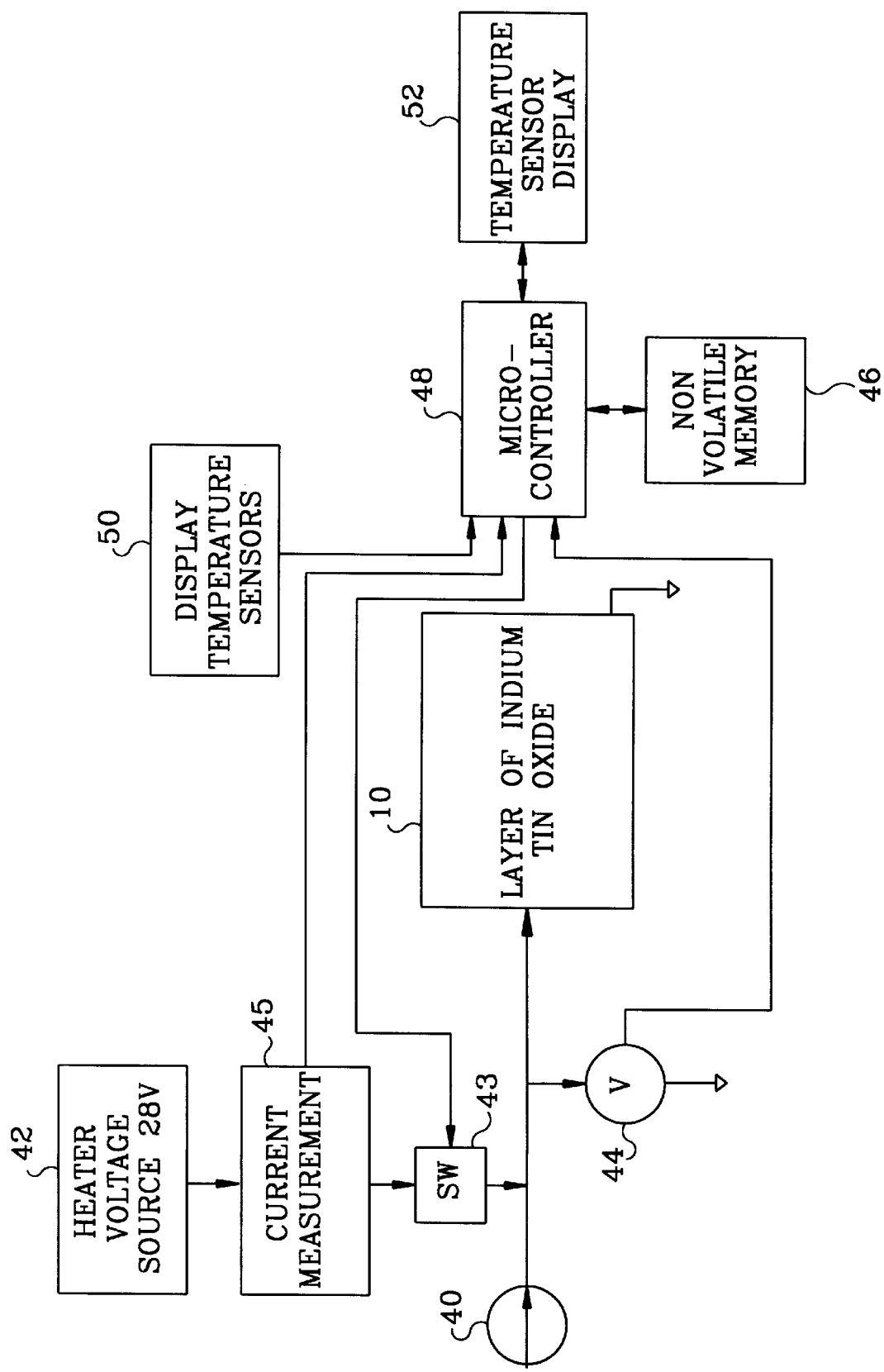

In the second embodiment of the invention shown in FIG. 5, the system is configured such that the temperature of the display can be measured at the same time it is being heated. In this embodiment, current measurement device 45 is inserted between the heater voltage source 42 and switch 43. Measurements from device 45 are transmitted to microcontroller 48. During operation of the heater, the current through the ITO layer is measured by device 45 and in conjunction with the known voltage, the resistance of the ITO layer and in turn the rate of change of the resistance can be calculated.

As mentioned above, current source 40 is always on. Because this current is very small when compared to the current measured with device 45, it can either be ignored or it can be accounted for with an offset which is programmed in microcontroller 48.

In another embodiment of the invention the current source 40 and the voltage meter 44 can be removed to save cost. The temperature of the LCD is measured by temporarily cycling on the heater and taking a measurement. The measurements can only be taken while the heater is on.

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A temperature sensor for a liquid crystal material, the temperature sensor being a part of a liquid crystal display (LCD) assembly, the temperature sensor comprising:
    a thin layer of transparent conductive material disposed across a viewing area of the LCD assembly;
    a precision current source which transmits a known current through the thin layer of conductive material;
    means to measure a voltage drop across the thin layer of transparent conductive material; and
    means to calculate a resistance of the thin layer of transparent conductive material based on the voltage drop and convert the resistance to a temperature reading.

2. The temperature sensor of claim 1 wherein the thin layer of transparent conductive material is made of indium tin oxide (ITO).

3. The temperature sensor of claim 1 wherein the thin layer of transparent conductive material is selectively connected to a separate voltage source in order to heat the LCD assembly.

4. The temperature sensor of claim 3 further comprising a current source measuring device which measures current through the thin layer of transparent conductive material while the thin layer of conductive material is connected to the separate voltage source, said current measuring device provides the current measurement to the means to calculate the resistance of the thin layer of transparent conductive material and a temperature reading is provided.

5. The temperature sensor of claim 1 wherein the LCD assembly further includes a plurality of precision temperature sensors positioned throughout the assembly to calibrate the temperature sensor.

6. The temperature sensor of claim 5 wherein the means to calculate the resistance of the thin layer of transparent conductive material receives inputs from the plurality of precision temperature sensors and provides an offset which is compared to the temperature reading.

7. The temperature sensor of claim 6 wherein the means to calculate the resistance of the thin layer of transparent material is a microprocessor.

8. A temperature sensor for a liquid crystal material, the temperature sensor being part of a liquid crystal display (LCD) assembly, the temperature sensor comprising:
    a thin layer of transparent conductive material disposed across a viewing area of the LCD assembly connected to a voltage source, said thin layer of transparent conductive material is for heating the LCD assembly;
    a precision current source which transmits a known current through the thin layer of conductive material;
    means to measure a voltage drop across the thin layer of the transparent conductive material; and
    means to calculate a resistance of the thin layer of transparent conductive material based on the voltage drop and convert the resistance to a temperature.

9. The temperature sensor of claim 8 wherein the thin layer of transparent conductive material is made of indium tin oxide (ITO).

10. The temperature sensor of claim 8 further comprising a current measuring device which measures a current through the thin layer of transparent conductive material while the thin layer of conductive material is connected to the separate voltage source, said current measuring device provides the current measurement to the means to calculate resistance of the thin layer of transparent conductive material and a temperature reading is provided.

11. The temperature sensor of claim 8 wherein the LCD assembly further includes a plurality of precision temperature sensors positioned throughout the assembly to calibrate the temperature sensor.

12. The temperature sensor of claim 11 wherein the means to calculate the resistance of the thin layer of transparent conductive material receives inputs from the plurality of precision temperature sensors and provides an offset which is compared to the temperature reading.

13. The temperature sensor of claim 12 wherein the means to calculate the resistance of the thin layer of transparent material is a microprocessor.

14. A temperature sensor for a liquid crystal material, the temperature sensor being a part of a liquid crystal display (LCD) assembly, the temperature sensor comprising:
    a thin layer of transparent conductive material disposed across a viewing area of the LCD assembly;
    a voltage source selectively connected to said thin layer of transparent conductive material for heating the LCD assembly;
    a current measuring device between the voltage source and the thin layer of transparent conductive material which measures a current through the thin layer of transparent conductive material while the thin layer of transparent conductive material is connected to the voltage source; and
    means to calculate a resistance of the thin layer of transparent conductive material connected to the current measuring device, said means calculates the resistance of the transparent conductive layer and converts the resistance to a temperature reading.

* * * * *